(12) United States Patent
Strueber

(10) Patent No.: US 7,880,351 B2
(45) Date of Patent: Feb. 1, 2011

(54) DRIVE WITH AN ELECTRIC MOTOR, A HOUSING AND A DIRECTION-DEPENDENT BRAKE

(75) Inventor: Juergen Strueber, Nuremberg (DE)

(73) Assignee: Buehler Motor GmbH, Nürnberg (DE)

( * ) Notice: Subject to any disclaimer, the term of this patent is extended or adjusted under 35 U.S.C. 154(b) by 310 days.

(21) Appl. No.: 12/153,123

(22) Filed: May 14, 2008

(65) Prior Publication Data

US 2008/0290746 A1  Nov. 27, 2008

(30) Foreign Application Priority Data

May 22, 2007  (DE)  ........................ 10 2007 023 712

(51) Int. Cl.
*H02K 7/102* (2006.01)
(52) U.S. Cl. .......................................... 310/77; 310/92
(58) Field of Classification Search ............... 310/75 R, 310/76, 77, 92, 93
See application file for complete search history.

(56) References Cited

U.S. PATENT DOCUMENTS

| | | | | |
|---|---|---|---|---|
| 3,495,108 A * | 2/1970 | Van Buskirk | ............. | 310/68 R |
| 4,059,339 A * | 11/1977 | Brown | ......................... | 359/461 |
| 4,059,779 A * | 11/1977 | Wistinghausen | ............. | 310/77 |
| 4,938,327 A | 7/1990 | Tominaga | | |
| 5,130,592 A * | 7/1992 | Bitsch et al. | ................. | 310/209 |
| 5,631,511 A * | 5/1997 | Schulmann et al. | ........... | 310/83 |
| 5,982,063 A * | 11/1999 | Lutz et al. | ..................... | 310/77 |
| 6,100,619 A * | 8/2000 | Buscher et al. | ............... | 310/99 |
| 6,740,997 B1 * | 5/2004 | Chen | ........................... | 310/77 |
| 6,798,102 B2 | 9/2004 | Adachi | | |
| 7,705,499 B2 * | 4/2010 | Drewe et al. | .............. | 310/75 D |
| 2007/0132324 A1 * | 6/2007 | Coupart | ..................... | 310/67 R |

FOREIGN PATENT DOCUMENTS

| | | |
|---|---|---|
| DE | 3412026 | 10/1985 |
| DE | 3918487 | 12/1989 |

\* cited by examiner

*Primary Examiner*—Dang D Le
(74) *Attorney, Agent, or Firm*—Jacobson Holman PLLC

(57) ABSTRACT

A drive with an electric motor, a housing and a direction-dependent brake, which includes a driver splined to a motor shaft, a drive output coupled freely pivotable around a small angle and shape-mated with the driver, several clamping devices and a clamping ring, in which the clamping devices cooperate with the clamping ring so that the brake conveys a torque from the electric motor to the driver output and brakes a back-driving torque of the drive output. The task of the invention is to present a brake in which no static redundancy occurs, which is simple to construct and in which no abrupt blocking is possible. This task is solved according to the invention in that the clamping ring is connected radially movable to the housing, a gearbox or a part attached to the housing so that the clamping ring after overcoming a defined force can be moved at least slightly radially by a clamping device.

20 Claims, 9 Drawing Sheets

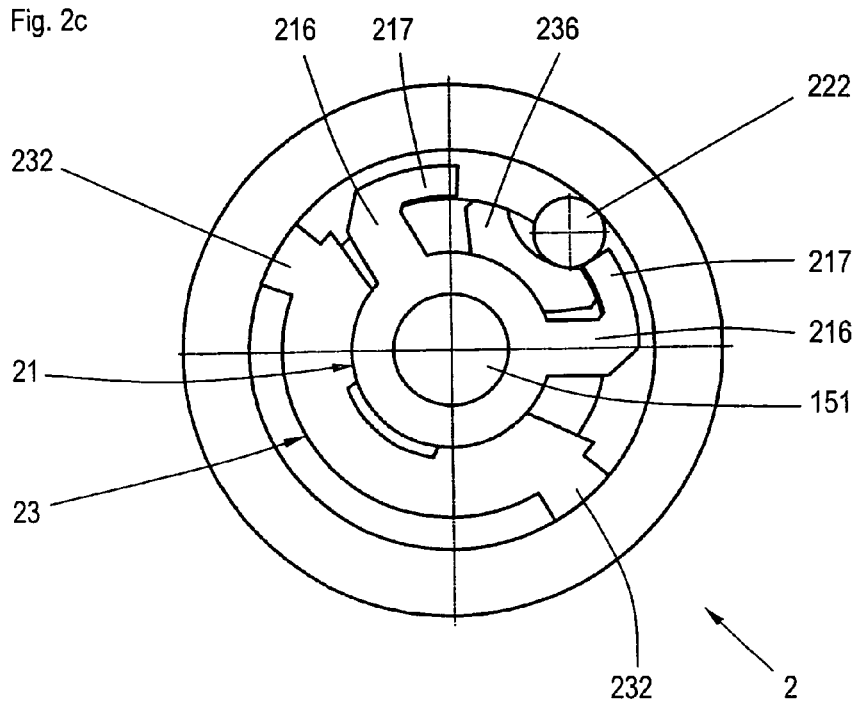
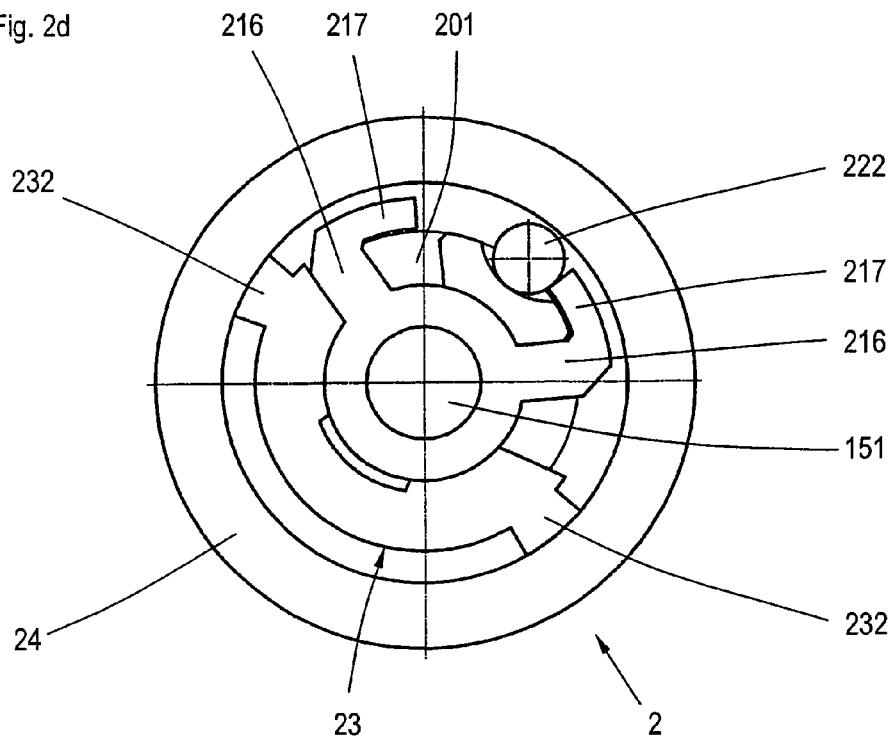

US 7,880,351 B2

DRIVE WITH AN ELECTRIC MOTOR, A HOUSING AND A DIRECTION-DEPENDENT BRAKE

BACKGROUND OF THE INVENTION (1) Field of the Invention

The invention concerns a drive that includes an electric motor, a housing and a direction-dependent brake.

(2) Description of Related Art

The invention concerns a drive that includes an electric motor, a housing, and a direction-dependent brake. A problem exists in the prior art related to the reliability of braking when the motor changes direction.

BRIEF DESCRIPTION OF THE INVENTION

The object of the invention is to provide a brake in which no static redundancy is present, is simply constructed, and in which no abrupt blocking is possible.

In a first embodiment the clamping ring is elastically connected to the motor housing, the gearbox or a part attached to the housing. Through this expedient no reverse rotation of the drive can occur even at high torque.

Since elastic systems have a tendency toward vibrations, it is proposed as an alternative solution to connect the clamping ring frictionally to the motor housing, the gearbox or a part that is attached to the housing. Rotatability is produced on this account beyond pivotability.

In order to produce a desired frictional force, the clamping ring should be spring-loaded against a part that is attached to the housing.

A particularly simple structure can be achieved by forcing the clamping ring axially against a part that is attached to the housing through the spring force of a spring washer. The same applies if the clamping ring lies against an intermediate housing cover or on an end plate.

It has proven expedient to arrange the clamping ring and clamping devices in a brake housing in which the clamping ring is slightly movable radially within the brake housing.

In order to obtain an even simpler design, when three clamping devices are present, two clamping devices should be rigid support devices and one clamping a movable clamping device. The number of parts is also reduced because of this structure. In order to improve functionally reliable clamping and self-inhibition it is proposed to design one clamping device as a roll body and two clamping devices as rigid support devices. By designing the rigid support devices in one piece with the driver output, the number of parts can be reduced.

It is advantageous to distribute the forces on the three clamping devices differently so that the moving clamping device experiences a smaller force than the two rigid support devices. This is achieved in that the angular distance of the rigid support devices relative to each other is greater than the angular distance between a support device and the moving clamping device. The angular distance of the rigid support device should lie in the range between 120 and 175°.

In a modification of the brake, the drive output should have a recess with a control surface in which the moving clamping device is accommodated in the recess. The control surface determines the properties of the brake. The flatter the control surface, the higher the attainable clamping force. In order to improve the functional reliability in each angle position the moving clamping device is formed by two roll bodies that are spaced from each other with a spring.

In another embodiment of the invention, three wedge-like clamping devices are provided. These are arranged at uniform angular distance around the drive output. The clamping devices also have an outer friction surface in the form of a circular ring segment with which they are frictionally connected tangentially to the clamping ring in the radially loaded state. Because of the large friction surfaces the surface pressure and friction are reduced so that the components are less loaded.

In order for sufficient braking effect to be attainable, the clamping devices on the side facing the motor shaft have two surfaces sloped toward a tangent, which cooperates with complimentary mating surfaces of the drive output, in which a maximum of one slope surface per clamping device is engaged with the corresponding mating surface.

It is also proposed that the drive output have a crown-like design and have three coupling protrusions extending axially from an annular region on which the corresponding mating surfaces are informed, that the drive output have two coupling surfaces per coupling protrusion, which cooperate with mating coupling surfaces of the driver, that the driver have two or three radial protrusions on which the mating coupling surfaces are formed and that the driver have at least one drive surface that cooperates tangentially with a mating drive surface of a clamping device.

In order to guarantee the best possible efficiency during motor operation, at least one drive surface of the driver should lie against a mating drive surface of a clamping device and against a coupling surface of the drive output. The sloped surfaces of a clamping device and the complimentary mating surfaces of the drive output are arranged relative to each other so that no radial force components are exerted on the clamping device.

In order to guarantee reliable braking during operation through an external torque acting on the output of the drive, after free pivoting of the drive output relative to the clamping devices around a small angle, at least a sloped surface of a clamping device lies against a complementary mating surface of the driver output, so that during further pivoting, a radial force component is exerted on the clamping device. The outer surface of the coupling device, which represents a braking surface, rubs against a mating braking surface of the clamping ring or frictionally connects the corresponding surfaces so that the rotational movement of the drive output is braked and, if necessary, stopped.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE INVENTION

Figure 1A:
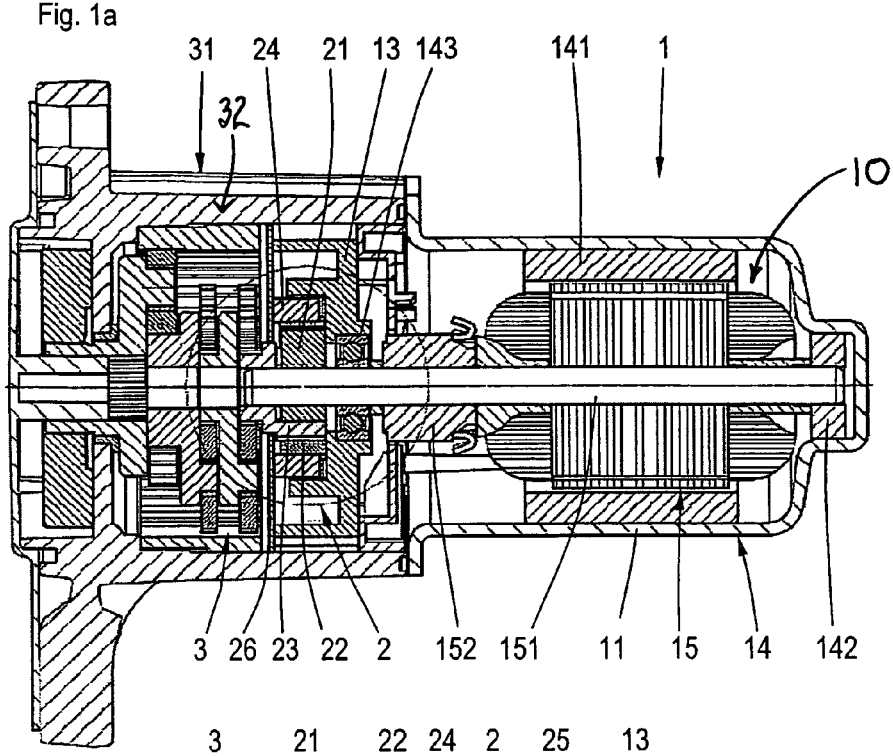
FIG. 1a shows a sectional view of a first embodiment of the invention with direction-dependent brakes and reduction gearing.

In describing preferred embodiments and variations of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1a shows a sectional view of drive 1 with an electric motor 10, consisting of a stator 14, with a housing 11, permanent magnet 141 and end plate 13, a rotor 15, with a motor shaft 151, a Commutator 152, a bearing 142, a bearing 143, a direction-dependent brake 2 and reduction gearing 3. The brake 2 consists of a driver 21, which is pulled firmly onto shaft 151, clamping devices 22, a clamping ring 24, which is movable in a limiting clamping ring free space 206 after overcoming a forced threshold radially or in any direction, spring 25 and a drive output 23.

Figure 1B:
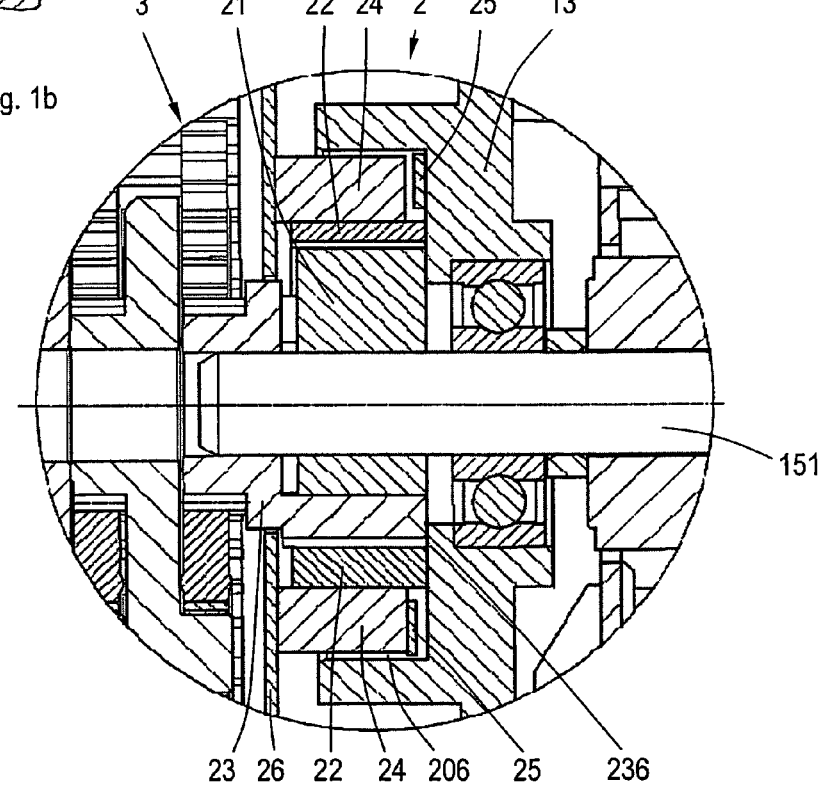
FIG. 1b shows an enlarged cutout of the brake of FIG. 1a, FIG. 2a shows the first embodiment of the brake in a first phase of operation.

FIG. 1b shows an enlarged cutout from the brake according to FIG. 1a. The spring 25 is an annular spring which is supported on one side on the end plate and on the other side on clamping ring 24 and forces the clamping ring 24 against a cover 26. The cover is fastened to end plate 13. The clamping ring free space 206 is bounded by an annular protrusion 131 of end plate 13, this protrusion determining the installation position of spring 25. The drive force of electric motor 1 is transferred by driver 21 to the drive output 23, the driver 21 cooperating with the drive output 23, like a positive clutch with a free pivot space. The brake 2 becomes active when a retroactive torque occurs from the drive output 23. The clamping devices 22 and clamping ring 24 serve as braking surfaces. The clamping ring 24 is frictionally connected to the end plate 13. During blocking of brake 2 a jerky behavior of the brake is prevented by frictional connection of the clamping ring 24 to end plate 13.

FIGS. 2a to 2d show a first embodiment of the brake 2 in different phases of operation. In the interest of simplicity, the housing parts, the end plate 13 and the spring 25 are left out. A driver 21 is pressed onto shaft 151. The driver 21 engages in shape-mated fashion into intermediate spaces between support devices 232 and a coupling protrusion 236 of a drive output 23, in which a drive free space 201 remains, which must initially be overcome from the initial position in order to drive the drive output, especially during a reversal in direction of rotation. No additional function is present during drive by the electric motor 10. During reversal of a torque from the drive output, the drive free space 201 is generally initially overcome. A moving clamping device, here designed as a roll body 222, is then moved, which is held in shape-mated fashion between a recess 231 of the coupling protrusion 236 and the clamping ring 24.

By the special geometric shaping of recess 231, whose inside surface is a control surface 238, in which the intermediate space between the coupling protrusion 236 and the inside surface of clamping ring 24 tapers, a pivot movement of the drive output leads to clamping of the moving clamping device 222. During clamping, radial forces occur through which rigid support devices 232 are forced against the inside surface of clamping ring 24. In the present embodiment, the rigid support devices 232 are arranged around the periphery of the drive output so that their spacing from each other is much greater than their spacing to the moving clamping device 222. Because of the resulting force distribution, large forces occur on the support devices 232 and a small force on the moving clamping device 222. The control surface 238 can be designed concave to convex. In convex control surfaces their radius must be larger than the radius of clamping ring 24 and its inside surface. In order to be able to loosen the clamped brake mechanically, the driver 21 is provided with radial protrusions 216 that serve to drive the drive output and tangential catches 217 are connected to the protrusions 216 which reduce the spacing to the moving clamping device 222. The length of catches 217 is dependent on the shape and radius of control surface 238. In a flatter control surface the moving clamping device can move in a large clamping device free space 205 until a clamping effect occurs, for which reason the catches 217 in this case are designed shorter or omitted entirely.

Figure 2A:
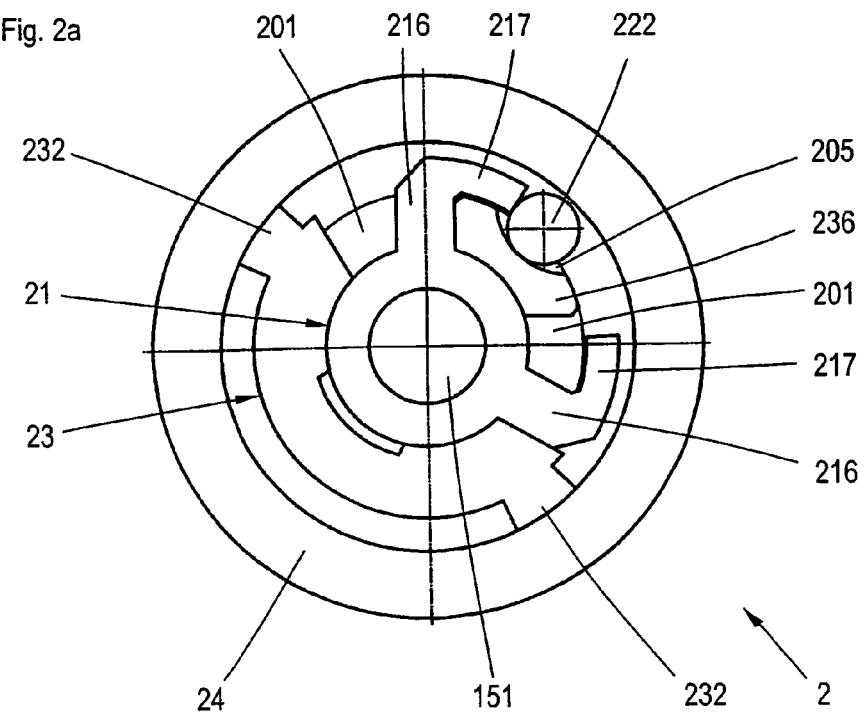
FIG. 2b shows the first embodiment of the brake in a second phase.
FIG. 2c shows the first embodiment of the brake in a third phase.
FIG. 2d shows the first embodiment of the brake in a fourth phase.

In the position depicted in FIG. 2a, the shaft 151 and driver 21 are moved clockwise and carry along the drive output in shape-mated fashion. At the same time the moving clamping device is continuously pushed out by catch 217 from a position that would be suitable for clamping.

Figure 2B:
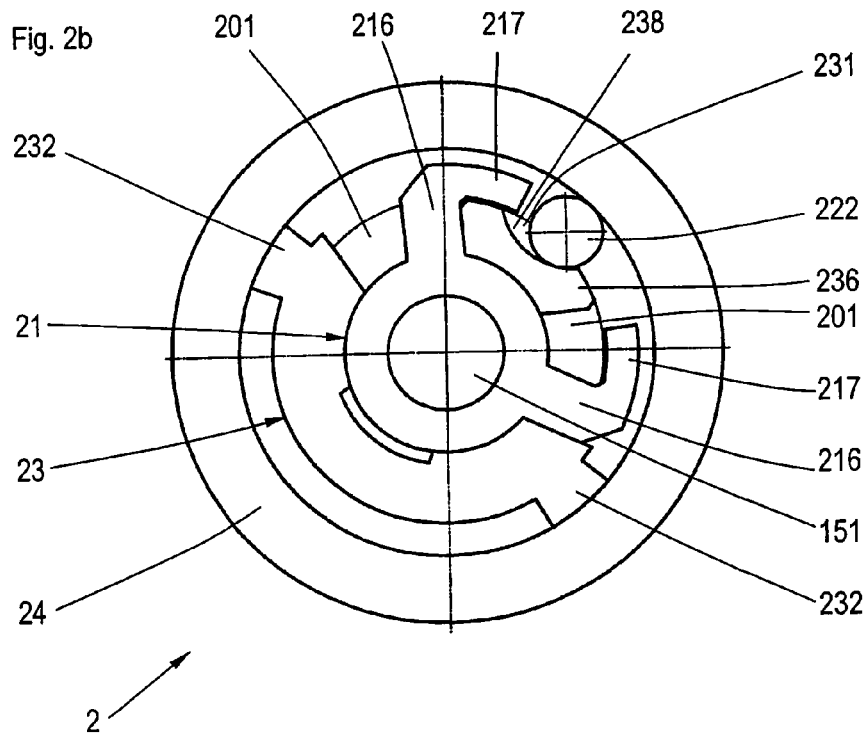

In the position depicted in FIG. 2b, a pivot movement counterclockwise is executed by the driver output 23, in which the moving clamping device 222 is forced into a position in which clamping occurs.

The phase in which the motor has rotated the driver 21 counterclockwise until one of the catches 217 touches the moving clamping device 222 and then moves it from the clamped position is shown in FIG. 2c.

The moving clamping device 222 is already pushed out of the clamped position in FIG. 2d and the electric motor can rotate the drive output 23 freely counterclockwise. During reversal of the direction of rotation of the electric motor the driver 21 would initially pivot back around the free pivot angle defined by the drive free space 201 with the drive output 23 stopped, in which the moving clamping device 222 is not actively moved.

Figure 3:
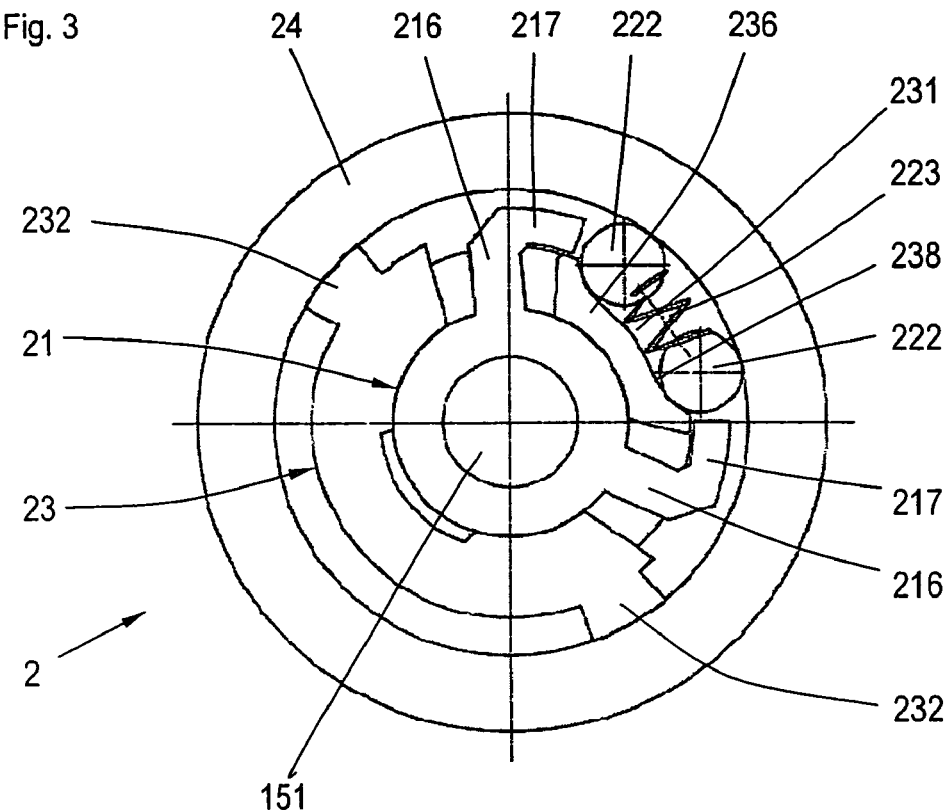
FIG. 3 shows a further version of the first embodiment of the brake.

FIG. 3 shows a version of the first embodiment of brake 2 in which the moving clamping device consists of two roller bodies 222 that lie in contact with the inside surface of the clamping ring 24 on one side through a pressure spring 223 and with the control surface 238 of a drive output, on the other side. Through this expedient, the brake becomes more reliable and reacts more quickly to back-torques. Because of the space requirement of the two roller bodies 222 and the compression spring 223, the control surface 238, the width of the coupling protrusion 236 and the length of the catches 217 are correspondingly adjusted.

Figure 4:
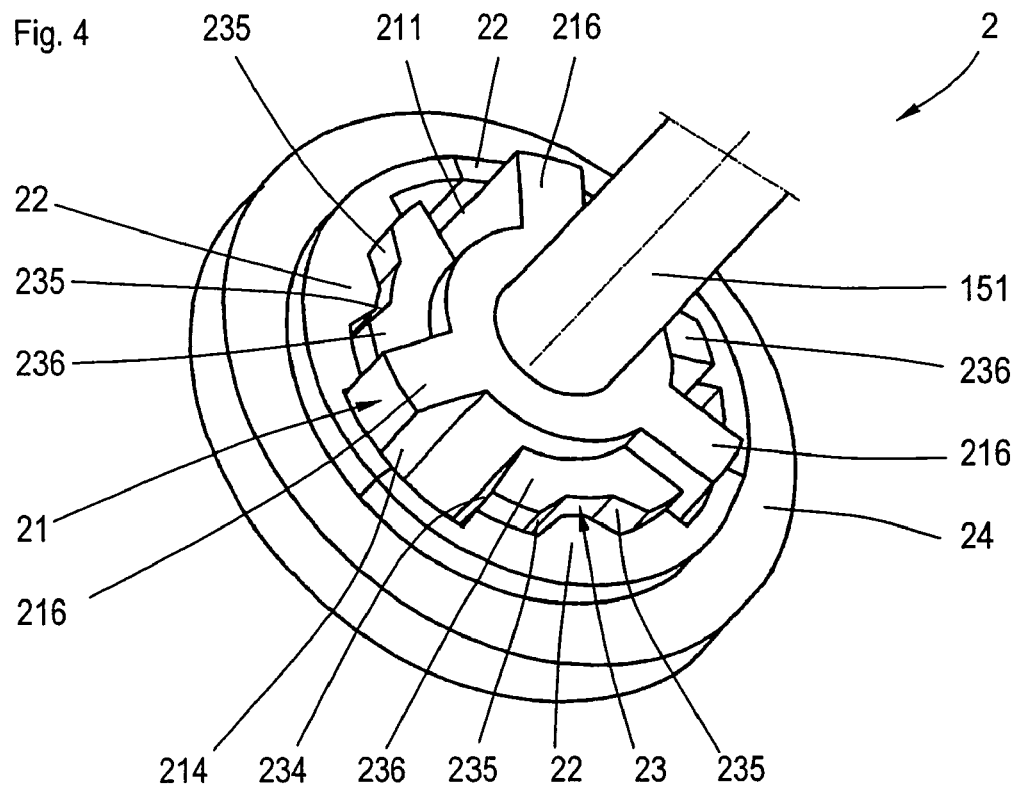
FIG. 4 shows a three-dimensional view of a second embodiment of the brake.

A second embodiment of the brake is show in FIGS. 4 to 8. FIG. 4 shows a three-dimensional view of the brake with a motor shaft 151, a driver 21 with radial protrusions 216, which together with coupling protrusion 236 of a coupling output 23 form a positive clutch in which a drive free space 201 remains between the coupling protrusions 236 and the protrusions 216, which permits limited free pivoting during a change of rotation direction. The difference relative to the first embodiment is that three coupling protrusions 216 are distributed uniformly around the periphery of a driver 21 and the same applies to coupling protrusions 236, coupling devices 22 are designed rigid without exception and the clamping effect is achieved by wedging of oblique surfaces 225, 235. The three clamping devices 22 are shaped identically and form annular segments in their base shape, in which limited intermediate spaces remain between their ends on the periphery in order to guarantee limited radial mobility. The clamping devices 22 during the action of a back-driving torque are nestled against the brake output 23 on the inside surface of clamping ring 24, which serves as a friction surface. A radial force component required for this is achieved through the oblique surfaces 225 of the clamping device 22 and the oblique surfaces 235 of the coupling protrusion 236. In the present example the oblique surfaces 225 of the clamping device 22 are formed on protrusions and the oblique surfaces 235 on indentations. A reversed arrangement would have had essentially the same effect with the difference that the cooperating surfaces 225, 235 would be radially farther removed from the axis of rotation.

Figure 5A:
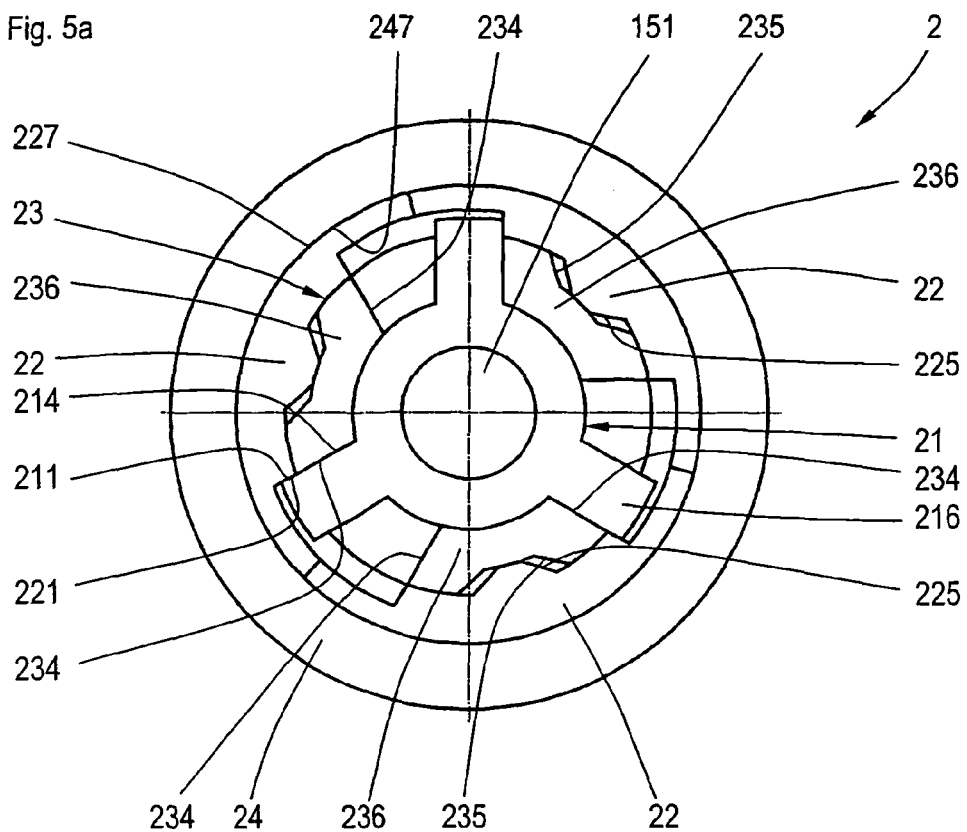
FIG. 5a shows the second embodiment in a first phase.

FIGS. 5a to 5d show the second embodiment of the brake in different phases of operation. The phase in which the electric motor 10 rotates the shaft 151 and with it the driver 21 clockwise is shown in FIG. 5a, in which the radial protrusions 216 lie on the inside with their drive surfaces 211 against coupling surfaces 234 of the coupling protrusions 236 on the outside against mating drive surfaces 221 of clamping device 22. Because of this the clamping devices 22 are held in a neutral position in which no clamping effect occurs. The mating drive surfaces 221 border recesses on the edges of clamping devices 22.

Figure 5B:
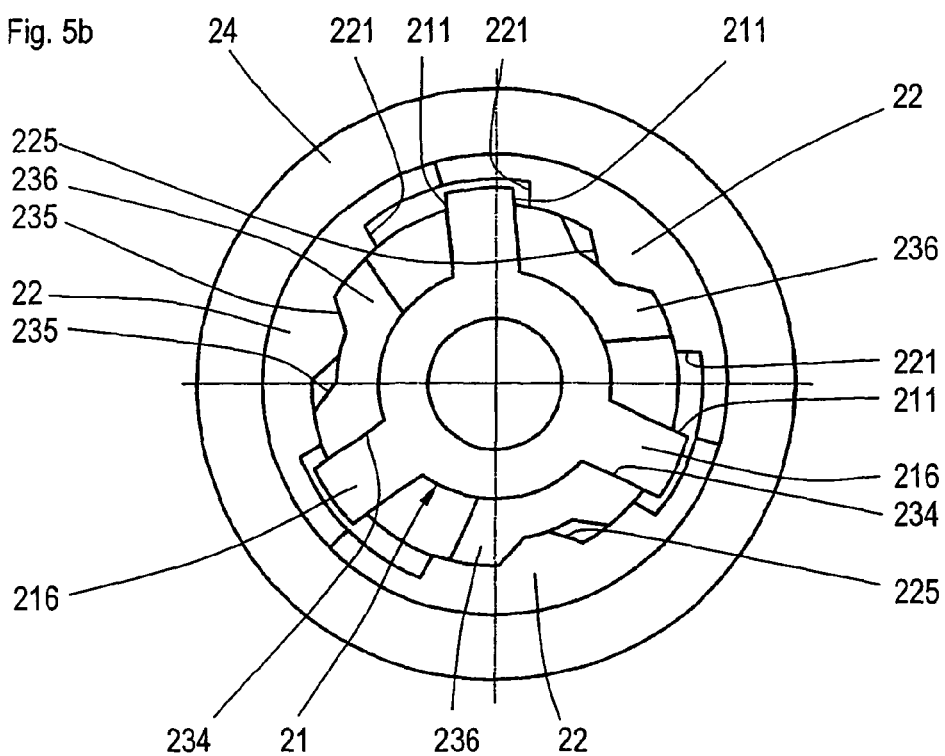
FIG. 5b shows the second embodiment in a second phase.

The phase in which a back-driving torque comes from drive output 23 and acts on brake 2 is shown in FIG. 5b, in which case the coupling protrusions 236 of the coupling output lie with their coupling surfaces 234 against the drive surfaces 211, whereas an additional pivoting through the oblique coupling surfaces 225 of clamping devices 22 may lie against the complementary mating surfaces 235 of coupling protrusion 236 so that a radial force component is produced that forces the clamping devices 22 against the inside surface of the clamping ring and therefore causes friction until clamping occurs.

Figure 5C:
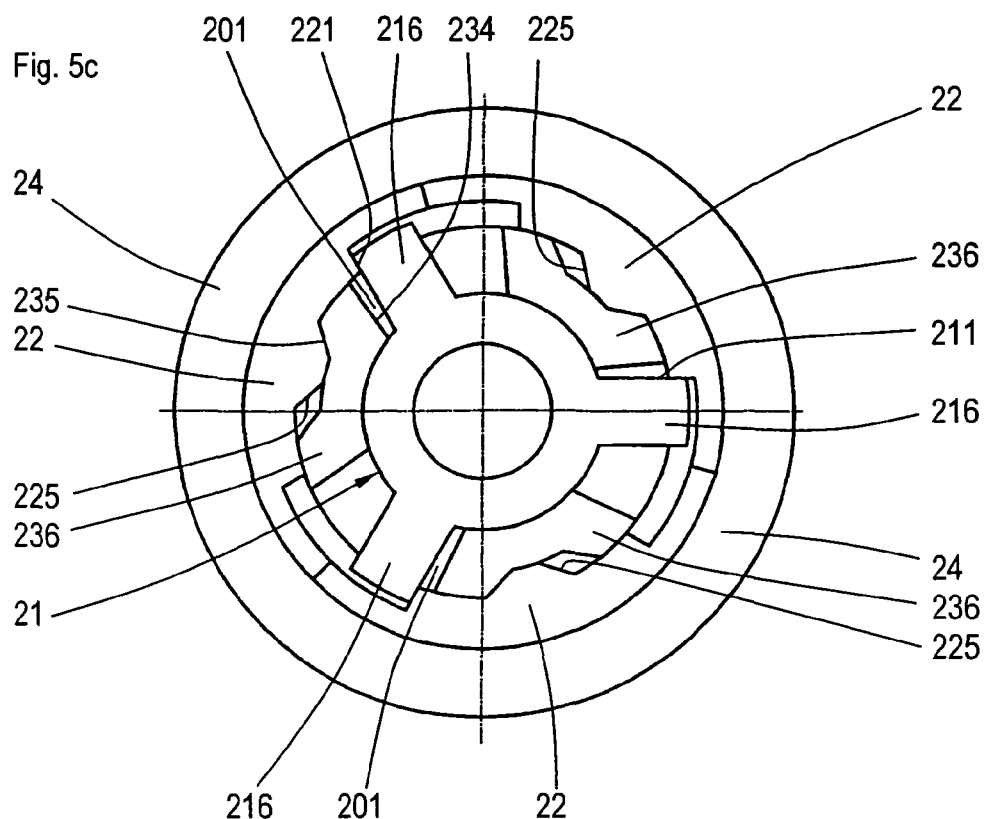
FIG. 5c shows the second embodiment in a third phase.
Figure 5D:
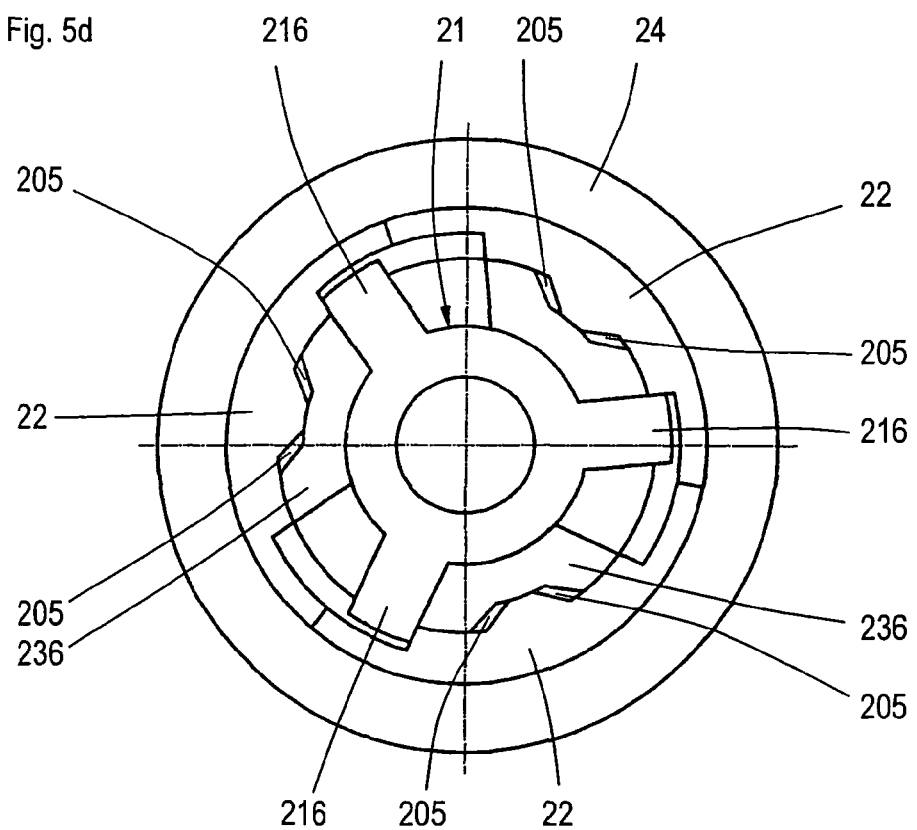
FIG. 5d shows the second embodiment in a fourth phase.

The phase in which motor movement has just started until drive surfaces 211 lie against the mating drive surfaces 221 is shown in FIG. 5c. In this state, in which clamping is still present, a drive free space 201 remains between the drive protrusions 216 of driver 21 and the coupling protrusions 236 of the brake output 23. This angle, which is defined by the drive free space 201 is further covered during further movement of the driver 21 until the coupling surface 234 of coupling protrusions 236 is reached (see FIG. 5d). During this pivot movement the clamping devices 22 are carried along over the mating drive surface 221 of the drive surfaces 211 of driver 21 and brought from the clamped position into a neutral position and on further pivoting or rotational movement in the same direction are held in this position.

Figure 6:
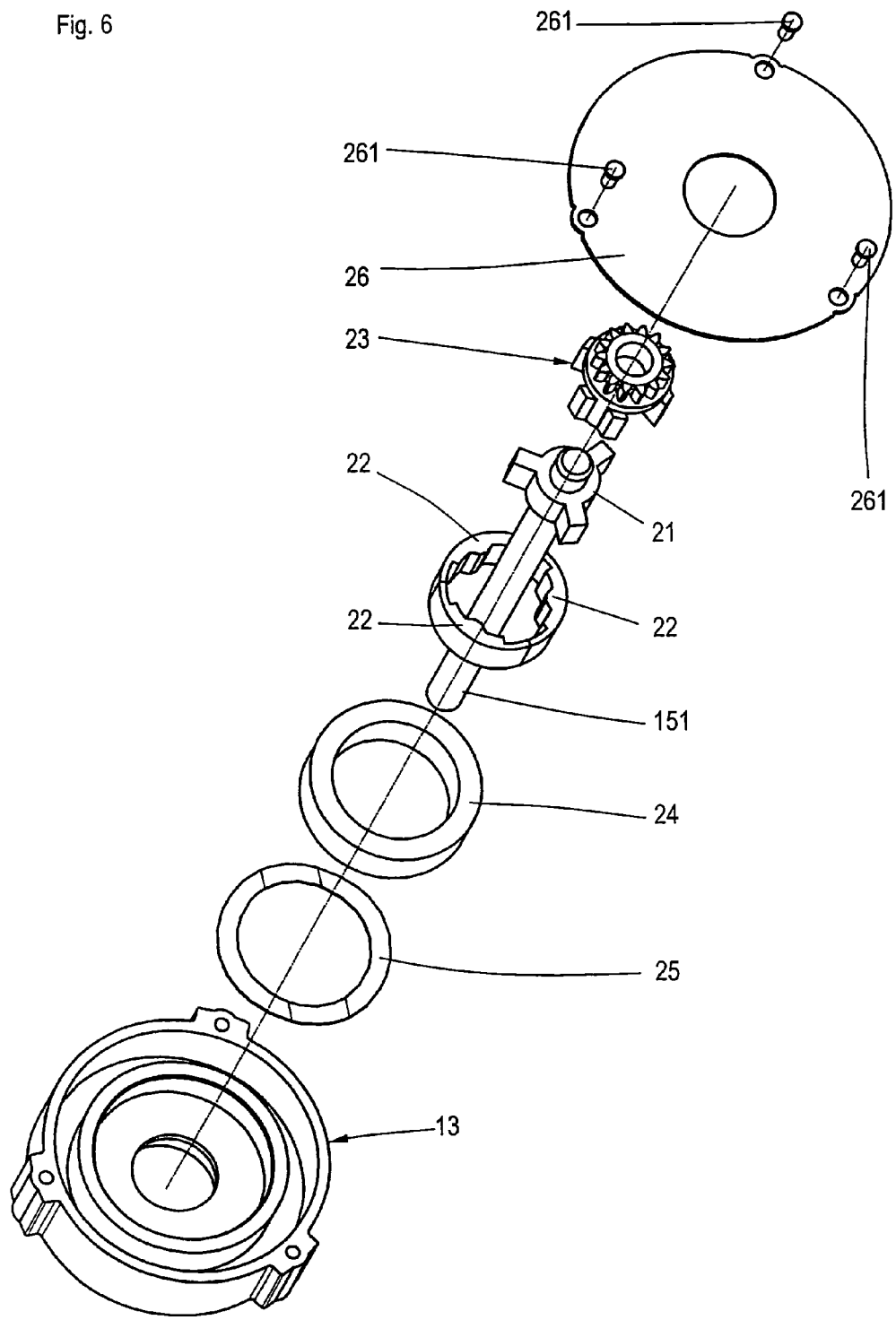
FIG. 6 shows an exploded view of the second embodiment of the brake.

FIG. 6 shows an exploded view of the second embodiment of the brake with a end plate 13, spring 25, clamping ring 24, motor shaft 151, the three clamping devices 22, the driver 21 pressed onto the motor shaft 151, the driver output 23, which is made in one piece with a pinion 233, cover 26 and a screw 261 for fastening of cover 26 to end plate 13. Clamping ring 24 is clamped by the spring force of spring 25 between the end plate 13 and the cover. Clamping ring is slightly movable radially on this account and after overcoming a torque defined by the spring force and friction parameters is also pivotable or rotatable. This arrangement permits relative jerk-free braking and during the action of back-driving torque on the drive output.

Figure 7A:
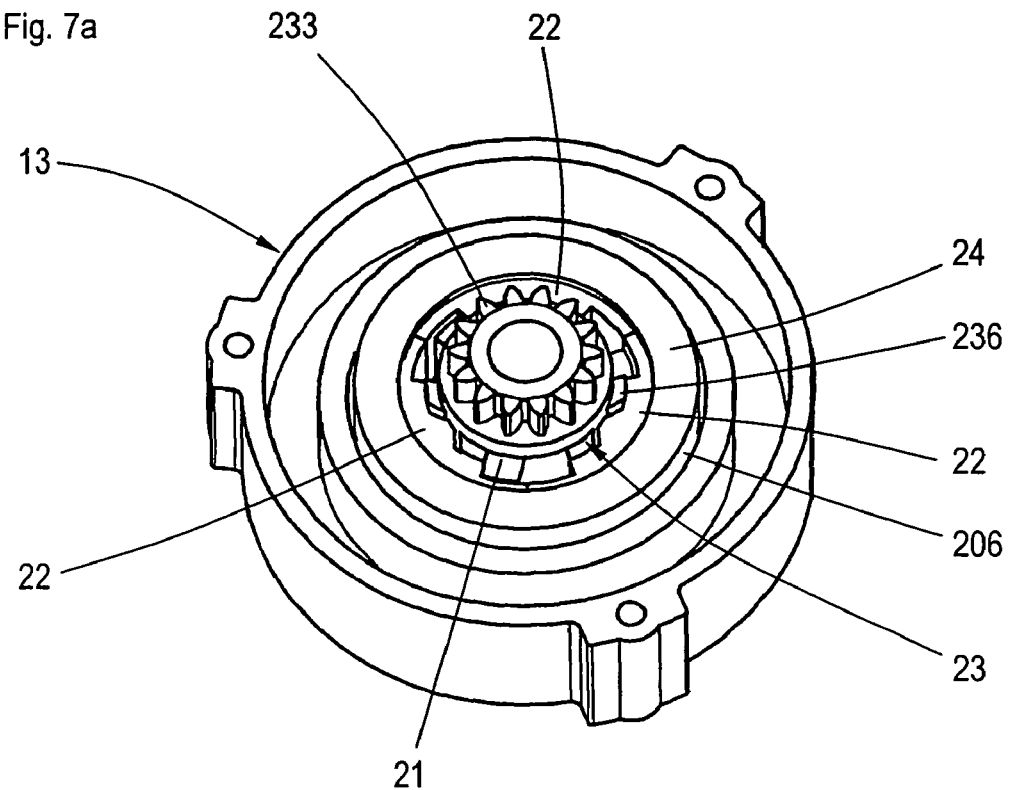
FIG. 7a shows the second embodiment of the brake in three dimensions.

FIG. 7a shows the second embodiment of the brake in three dimensions with the cover removed. It is readily apparent that there is a clamping free space 206 that permits slight radial deflection of a clamping ring 24 after overcoming the aforementioned friction. This radial reflection capability prevents status redundancy and compensates for manufacturing inaccuracies. This leads to a more reliable operation of the brake.

Figure 7B:
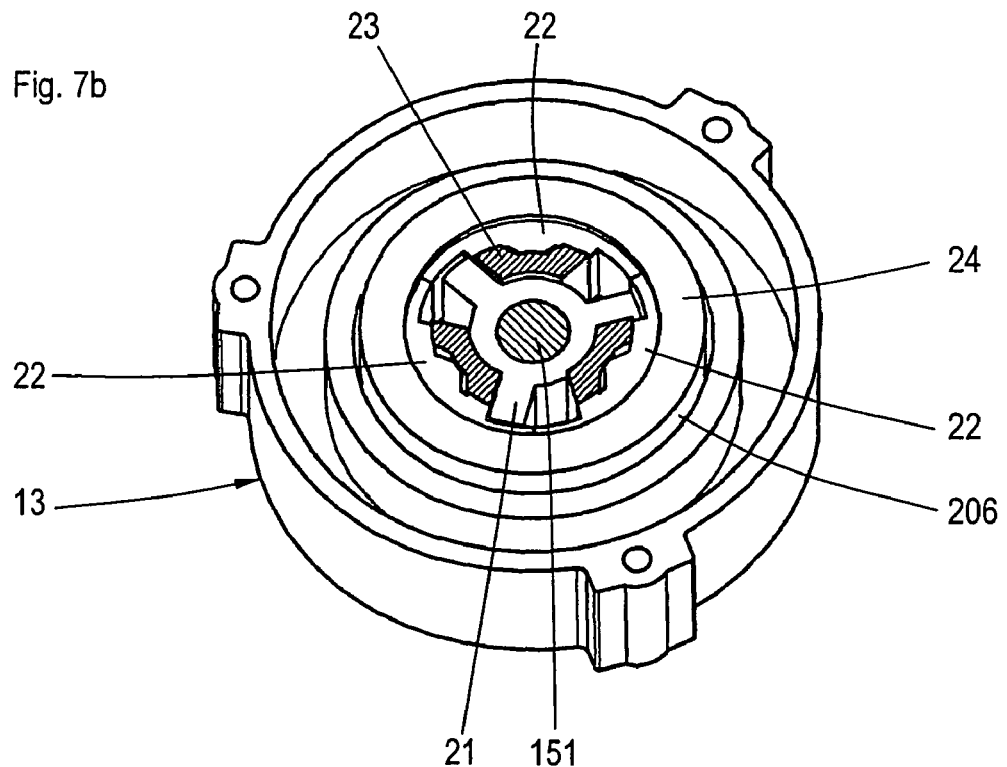
FIG. 7b shows the second embodiment of the brake from FIG. 7a with a section through a drive output.

FIG. 7b shows the second embodiment of the brake in FIG. 7a with a section through a drive output.

Figure 8A:
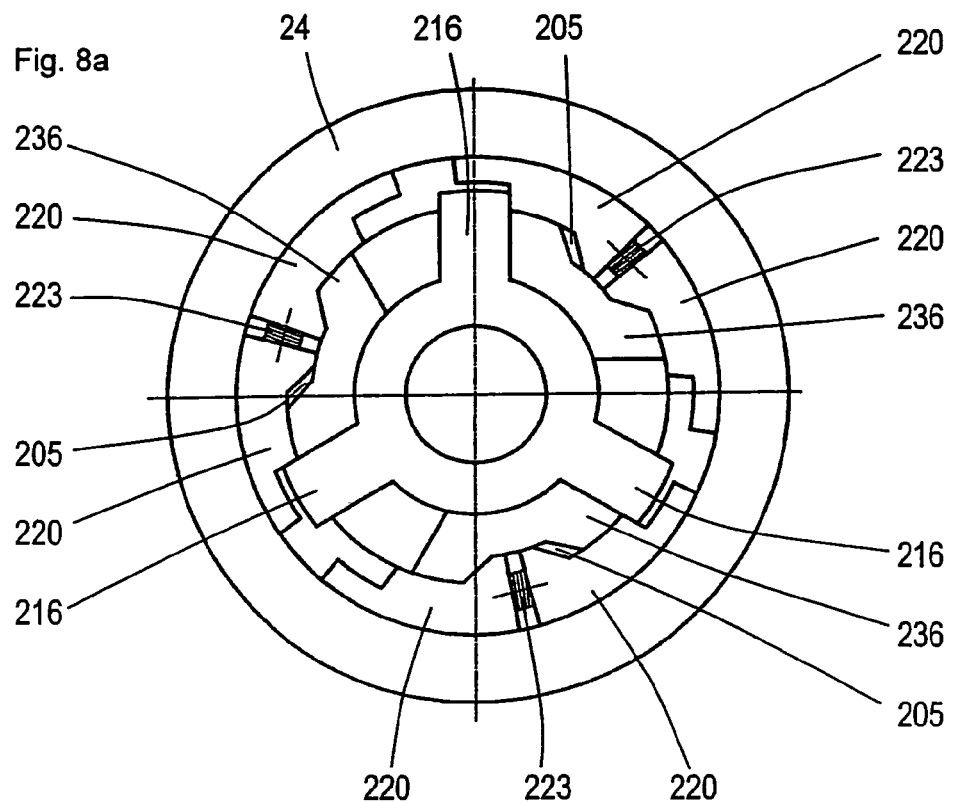
FIG. 8a shows a further version of the second embodiment in a first phase and FIG. 8b shows the version of the second embodiment in a second phase.
Figure 8B:
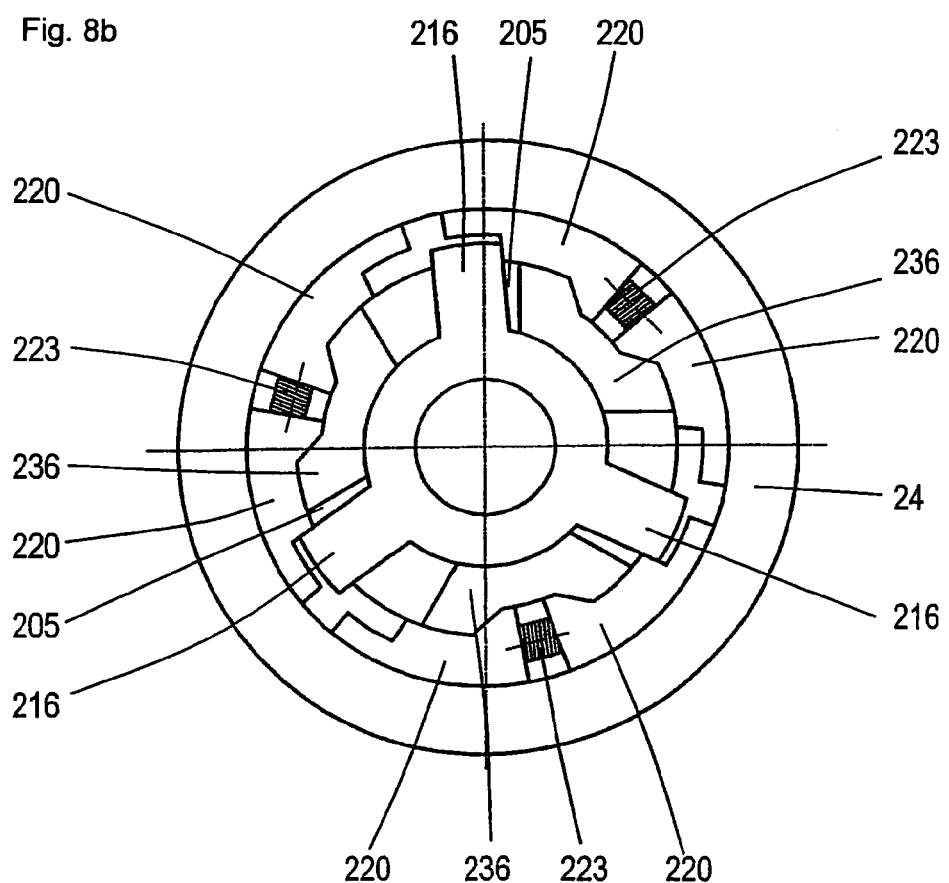

A version of the second embodiment is shown in a first phase in FIG. 8a and in a second phase in FIG. 8b. The first phase shows the brake in a clamped position and the second phase shows the brake in an unclamped position (motor operation). The clamping devices 220 are divided and the two halves are forced from each other by a compression spring 223 so that in each phase there is freedom of play of the clamping devices 220. Because of this more reliable and more fast-acting operation is guaranteed.

It is to be understood that the present invention is not limited to the illustrated embodiments described herein. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMBERS

1 Drive
10 Electric motor
11 Housing
13 End plate
131 Protrusion
14 Stator
141 Permanent magnet
142 Bearing
143 Bearing
15 Rotor
151 Shaft
152 Commutator
2 Coupling
201 Drive free space
202 Coupling free space
205 Clamping device free space
206 Clamping ring free space
21 Drive
211 Drive surface
214 Mating coupling surface
216 Radial protrusion
217 Catch
22 Clamping device
220 Clamping device half
221 Mating drive surface
222 Roll body
223 Compression spring
227 Braking surface
225 Sloped surface
23 Drive output
231 Recess
232 Support device 233 Pinion
234 Coupling surface
235 Complementary mating surface
236 Coupling protrusion
238 Control surface
24 Clamping ring
247 Mating braking surface
25 Spring
26 Cover
261 Screw
3 Reduction gearing
31 Gearbox
32 Brakes

What is claimed is:

1. A drive comprising:
an electric motor having a motor shaft;
a gearbox;
a housing holding the motor; and
a direction-dependent brake operatively connected to the motor and the gearbox, the direction dependent brake including
a driver connected to the motor shaft,
a drive output connected to the gearbox and coupled to the driver and freely pivotable around a small angle,
a plurality of clamping devices, and
a clamping ring cooperating with the plurality of clamping devices so that the brake conveys a torque originating in the electric motor to the drive output and halts a back-driving torque of the drive output, wherein the clamping ring is connected radially movable relative to the housing so that the clamping ring can be moved radially by at least one of the clamping devices after overcoming a specified force.

2. The drive according to claim 1, wherein the clamping ring is elastically connected to the motor housing or the gearbox.

3. The drive according to claim 1, wherein the clamping ring is frictionally connected to the motor housing or the gearbox.

4. The drive according to claim 1, further comprising a spring for spring-loading the clamping ring against a part attached to the housing.

5. The drive according to claim 1, wherein the clamping ring lies against a cover or an end plate provided in the direction-dependent brake.

6. The drive according to claim 1, further comprising a brake housing, wherein the clamping ring and the clamping devices are arranged in a brake housing, in which the clamping ring is radially movable within the brake housing.

7. The drive according to claim 1, wherein there are three clamping devices with two clamping devices being rigid support devices and one clamping device being a movable clamping device.

8. The drive according to claim 7, wherein the angular distance of the rigid support devices relative to each other is greater than the angular distance between a support device and the movable clamping device.

9. The drive according to claim 8, wherein the angular distance of the rigid support devices lies in the range between 120° and 175°.

10. The drive according to claim 7, wherein the movable clamping device is formed by two roller bodies, which are spaced from each other with a spring.

11. The drive according to claim 1, wherein the number of clamping device is three and wherein one clamping device is a roll body and the other two clamping devices are rigid support devices.

12. The drive according to claim 1, wherein the drive output has a recess with a control surface, the movable clamping device being accommodated in the recess.

13. The drive according to claim 1, wherein the clamping devices each have an outer friction surface in the form of a circular ring segment, each ring segment being frictionally connected tangentially to the clamping ring in a radially loaded state.

14. The drive according to claim 1, wherein one of the clamping devices faces the motor shaft and has two surfaces sloped toward a tangent, which cooperates with complementary mating surfaces of the drive output, a maximum of one slope surface per clamping device being engaged with a corresponding mating surface of the drive output.

15. The drive according to claim 14, wherein the drive output is crown-like and has three coupling protrusions protruding axially from a ring area on which the corresponding mating surfaces are formed.

16. The drive according to claim 1, wherein the drive output has two coupling surfaces per coupling protrusion, which cooperate with mating coupling surfaces of the driver.

17. The drive according to claim 16, wherein the driver has at least two radial protrusions on which the mating coupling surfaces are formed.

18. The drive according to claim 16, wherein the driver has at least one drive surface that cooperates tangentially with a mating drive surface of at least one clamping device.

19. The drive according to claim 1, wherein during operation of the motor at least one drive surface of the driver lies against a mating drive surface of at least one of the clamping devices and against a coupling surface of the drive output, in which the sloped surfaces and the at least one clamping device and the complementary mating surfaces of drive output are arranged relative to each other so that no radial force component is exerted on the at least one clamping device.

20. The drive according to claim 1, further comprising: a coupling device, wherein, during operation, at least one sloped surface of at least one clamping device lies against a complementary mating surface of the driver output so that, during further pivoting, a radial force component is exerted on the at least one clamping device and the outer surface of the coupling device, which represents a braking surface, and rubs against a mating braking surface of the clamping ring or frictionally connects the corresponding surfaces so that the rotational movement of the drive output is braked.

* * * * *